United States Patent Office 3,411,378
Patented Nov. 19, 1968

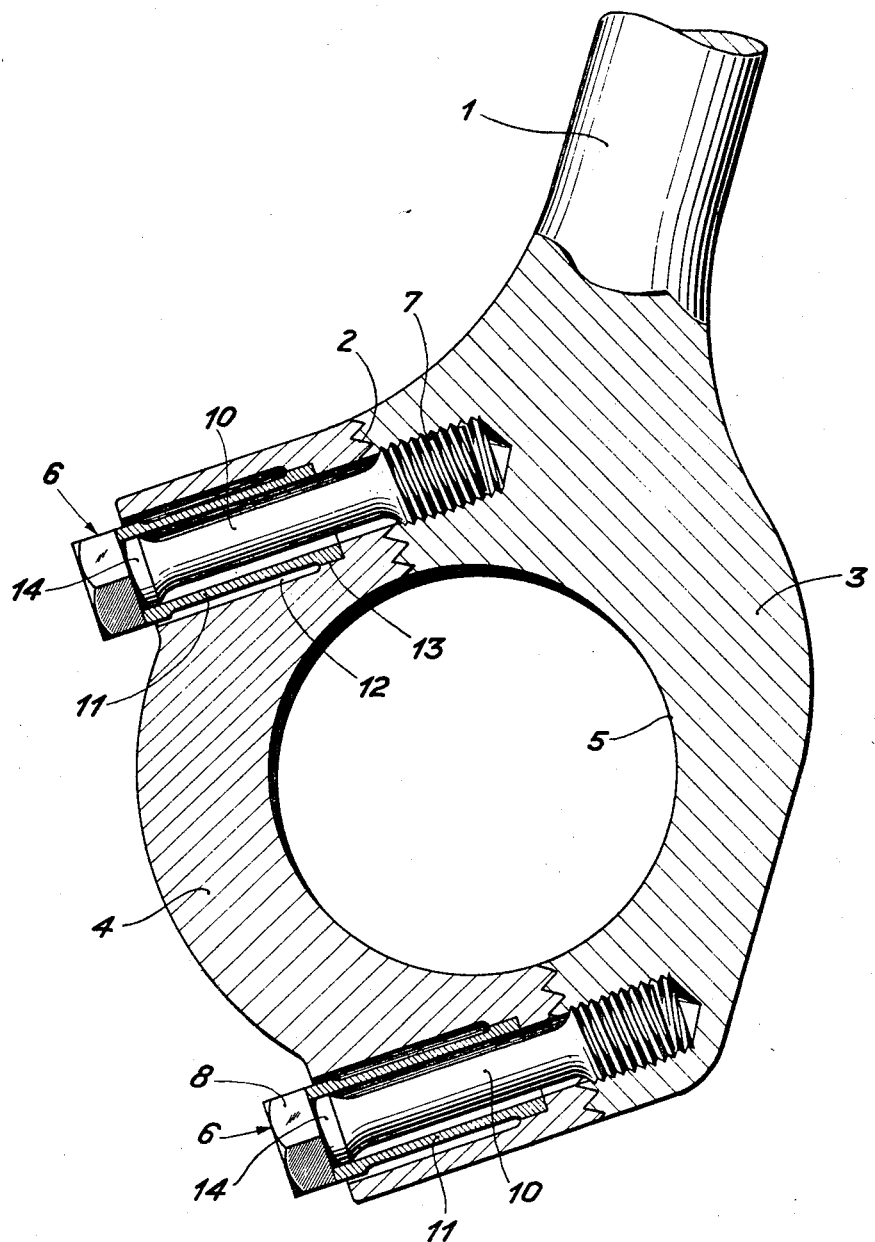

3,411,378
SPLIT CONNECTING ROD
Pierre Borgeaud, Winterthur, Switzerland, assignor to Sulzer Brothers Limited, Winterthur, Switzerland, a Swiss company
Filed Sept. 21, 1966, Ser. No. 581,072
Claims priority, application Switzerland, Sept. 24, 1965, 13,254/65
5 Claims. (Cl. 74—579)

The present invention pertains to a "split" or two-part connecting rod in which the parting line or separation between the shank and the cap extends obliquely to the length of the shank and in which screws are employed to fasten the cap to the shank. The invention provides a connecting rod of this type in which there is provided for each screw a member between the head of the screw and the cap of the connecting rod permitting motion of the outer end of the screw with respect to the cap in directions transverse to the length of the screw.

In two-part connecting rods, especially those in which the parting plane or separation between the cap and the shank extends obliquely to the length of the shank, when the rod is placed under load, as during operation of the engine or machine in which the rod is used, complicated stress patterns are developed in the fastening screws which make difficult the design and dimensioning thereof. The cap itself is deformed in a complicated manner during operation. In the connecting rods of this type of the prior art known to me, the screws bear against the cap at the heads thereof or by means of nuts threaded onto them and are held substantially stationary with respect to the cap at their points of engagement with the cap. Consequently, the deformations of the cap impose on the screws transverse stresses additional to their tensile stresses, and these transverse stresses substantially increase the total stress or load to which the material of the screws is subjected, and can under certain circumstances give rise to malfunction or trouble.

The invention provides a connecting rod construction avoiding these disadvantages and largely liberating the screws from these supplementary transverse stresses.

The invention will now be further described in terms of a non-limitative example and by reference to the accompanying drawing in which the single figure of drawing is a fragmentary view of the "big end" or crankshaft bearing end of a connecting rod in accordance with the invention, the showing at the crankshaft bearing end being in a section perpendicular to the axis of that bearing. In the drawing the connecting rod has a shank indicated at 1 and a cap 4, the two being joined at a serrated parting surface 2 which is obliquely inclined to the length of the shank 1. The saddle-shaped portion at the end of the shank adjacent the cap is identified at reference character 3. The parts 3 and 4 together surround and define a bearing bore or aperture 5 which supports in known fashion an anti-friction bearing insert which in operation embraces one of the cranks of the crankshaft in the engine or other machine in which the connecting rod is employed. The parts 3 and 4 are joined by means of screws 6 having a threaded portion 7 engaging the part 3, a head 8, and a cylindrical shaft 10. The head 8 is desirably provided with angular faces as shown in order to permit it to be seized with a wrench. Each of the screws is surrounded, over part of its length, by a sleeve 11 accommodated with clearance in a bore 12 formed in the cap. The bore 12 is graduated, being provided with a portion 13 of reduced diameter at the bottom thereof, i.e. adjacent the parting surface 2, the portion 13 being dimensioned to fit the lower end of the sleeve 11 in order to center the sleeve with respect to the screw. Advantageously, the sleeve 11 may possess a press fit in the lower bore portion 13. A small amount of play may however be accepted there. The balance of the length of bore 12 has a larger diameter so as to permit a certain amount of lateral motion between the outer end of the screw and its head 8 (with the adjacent part of the sleeve 11) on the one hand and the surrounding portions of the cap 4 on the other. Immediately beneath the head 8, the shank of the screw is provided with a cylindrical surface 14 which is slightly smaller in diameter than the internal diameter of the sleeve and which serves to center the outer end of the sleeve about the screw.

If during operation of the machine or engine employing the connecting rod of the invention there occur deformations of the cap 4, these are transmitted only in very small degree to the heads 8 of the screws 10 since the sleeves 11 engage the cap down close to the parting surface 2, leaving the heads of the screws otherwise without connection to the cap 4. The sleeves 11 moreover possess elasticity of their own which further reduces transfer to the screws of the deformations of the cap, which themselves are small down at the reduced portion 13 of the bores 12 where the sleeves engage the cap. Consequently the screws are subjected practically only to tensile stresses, and these can be determined relatively exactly by calculation and thus provided for.

Since in the construction of the invention the sleeves 11 bear against the cap close to the parting surface 2, the proportion of the total load on the screws which is attributable to dynamic strains arising during operation by deformation of the cap, is small. Moreover, the elastic nature of the coupling between the screws and the connecting rod parts 3 and 4 is further increased by the elasticity of the sleeves 11. Consequently it is possible to employ relatively stiff screws with a large cross-section and which can therefore press the cap 4 against the saddle portion 3 of the connecting rod with high pressures. In many cases in which heretofore four screws were necessary to join the cap to the shank of the connecting rod, it is sufficient with the construction of the invention to employ only two.

The invention is not limited to the construction shown in the drawing and hereinabove described, various modifications on and departures therefrom being possible within the scope of the invention. Thus the bores 12 need not be of graduated diameter. Instead, with a bore of a single diameter there may be employed a sleeve having either integral therewith or separate therefrom a ring at the lower end thereof effecting and centering of the sleeve with respect to the bore 12. Indeed it is possible to dispense with the sleeve entirely, and to liberate the screws from lateral stresses by means of a cylindrical cavity in the cap 4 having approximately the shape of the space between the sleeve 11 and the bore 12. Moreover, in place of the screws shown there may be employed screws having a nut threadable onto the ends thereof remote from the shank, one construction for such a nut combining the nut with the sleeve 11.

It will thus be seen that the invention provides a connecting rod comprising a shank portion 1 and a cap portion 4, those portions having mating surfaces 2 extending obliquely to the length of the shank, a plurality of screws 10 securing the cap to the shank, and a tubular member 11 disposed about each of the screws and engaged between the head of the screw and the cap. Preferably the tubular member 11 has clearance from the cap over at least the part of that member adjacent the head of the screw or the equivalent nut at the outer end of the screw. The tubular member 11 may be of substantially cylindrical shape, and it may desirably have a minimum annular cross-sectional area substantially equal to the minimum cross-sectional area of the screw within it. Moreover, the cap includes preferably for each screw a bore 12 having at the end thereof adjacent those mating surfaces a diameter fitting about the tubular member 11 with small clearance, the bore having at the end thereof remote from the mating surfaces a larger clearance from the tubular member.

While the invention has been described above in terms of a presently preferred embodiment, the invention itself is not limited thereto but rather includes all modifications on and departures from the embodiment so described and illustrated, properly falling within the spirit and scope of the appended claims.

I claim:

1. A connecting rod comprising a shank portion and a cap portion, said portions having mating surfaces extending obliquely to the length of the shank, a plurality of screws securing the cap to the shank, and a tubular member disposed about each of said screws and engaged between the head of the screw and the cap.

2. A connecting rod according to claim 1 wherein said tubular member has clearance from the cap over at least the part of said member adjacent the head of the screw.

3. A connecting rod according to claim 1 in which said tubular member is of substantially cylindrical shape.

4. A connecting rod according to claim 3 in which the minimum annular cross-sectional area of said tubular member is substantially equal to the minimum cross-sectional area of said screw.

5. A connecting rod according to claim 1 wherein the cap includes for each screw a bore having at the end thereof adjacent said mating surfaces a diameter fitting about said tubular member with small clearance, said bore having at the end thereof remote from the mating surfaces a larger clearance from the tubular member.

References Cited

UNITED STATES PATENTS

| | | | |
|---|---|---|---|
| 2,473,096 | 6/1949 | Hamill et al. | 74—579 |
| 3,314,305 | 4/1967 | Friedrich | 74—579 |

FRED C. MATTERN, Jr., *Primary Examiner.*

F. D. SHOEMAKER, *Assistant Examiner.*